United States Patent
Soundrarajan

(10) Patent No.: US 10,841,821 B2
(45) Date of Patent: Nov. 17, 2020

(54) NODE PROFILING BASED ON COMBINATION OF PERFORMANCE MANAGEMENT (PM) COUNTERS USING MACHINE LEARNING TECHNIQUES

(71) Applicant: HCL TECHNOLOGIES LIMITED, Uttar Pradesh (IN)

(72) Inventor: Rahul Soundrarajan, Bengaluru (IN)

(73) Assignee: HCL TECHNOLOGIES LIMITED (IN)

(*) Notice: Subject to any disclaimer, the term of this patent is extended or adjusted under 35 U.S.C. 154(b) by 0 days.

(21) Appl. No.: 16/265,029

(22) Filed: Feb. 1, 2019

(65) Prior Publication Data

US 2020/0252812 A1    Aug. 6, 2020

(51) Int. Cl.

| | | |
|---|---|---|
| *G06F 15/173* | (2006.01) | |
| *H04W 24/08* | (2009.01) | |
| *G06F 11/34* | (2006.01) | |
| *G06F 11/30* | (2006.01) | |
| *G06N 20/00* | (2019.01) | |
| *H04L 12/26* | (2006.01) | |

(52) U.S. Cl.
CPC ......... *H04W 24/08* (2013.01); *G06F 11/3006* (2013.01); *G06F 11/3409* (2013.01); *G06N 20/00* (2019.01); *H04L 43/04* (2013.01); *H04L 43/065* (2013.01); *H04L 43/0823* (2013.01)

(58) Field of Classification Search
CPC ............. H04L 43/0852; H04L 43/0829; H04L 65/1069; H04L 43/16; H04L 45/28; H04L 65/80; H04L 43/087; H04L 45/22; H04W 24/08; H04W 24/02; H04W 40/02; H04W 24/00; H04W 24/10; H04W 28/08; H04W 28/18; H04M 7/0057

See application file for complete search history.

(56) References Cited

U.S. PATENT DOCUMENTS

| | | |
|---|---|---|
| 8,811,977 B2 | 8/2014 | Austin et al. |
| 2004/0259555 A1 | 12/2004 | Rappaport et al. |
| 2005/0164685 A1 | 7/2005 | Yoshioka |
| 2011/0222432 A1* | 9/2011 | Westerberg ........... H04L 43/026 370/253 |

(Continued)

FOREIGN PATENT DOCUMENTS

| | | |
|---|---|---|
| EP | 2869625 A1 | 5/2015 |
| EP | 2887728 A1 | 6/2015 |
| WO | 2017019018 | 2/2017 |

*Primary Examiner* — Michael A Keller
*Assistant Examiner* — Thao D Duong
(74) *Attorney, Agent, or Firm* — Hayes Soloway P.C.

(57) ABSTRACT

Disclosed is a system for profiling one or more nodes based on a hybrid Key Performance Indicator (KPI). Initially, a flag indicating an issue with a KPI is received. A set of Performance Management (PM) counters undergoing periodic changes in performance beyond a predefined threshold by using machine learning based statistical techniques is identified. The set of PM counters may comprise a set event based of PM counters and a set of protocol based PM counters. A hybrid KPI is created based on combination of the set event based of PM counters and the set of protocol based PM counters. One or more nodes are profiled by comparing the hybrid KPI associated to the node with hybrid KPI corresponding to each of the one or more nodes.

11 Claims, 9 Drawing Sheets

(56) References Cited

U.S. PATENT DOCUMENTS

| | | | |
|---|---|---|---|
| 2015/0120901 A1* | 4/2015 | Baumgartner | H04L 41/507 709/224 |
| 2016/0381580 A1* | 12/2016 | Kwan | H04L 41/16 370/252 |
| 2017/0004263 A1* | 1/2017 | Glidewell | G06F 19/00 |
| 2019/0182105 A1* | 6/2019 | Stephens | H04L 41/0672 |

* cited by examiner

NODE PROFILING BASED ON
COMBINATION OF PERFORMANCE
MANAGEMENT (PM) COUNTERS USING
MACHINE LEARNING TECHNIQUES

PRIORITY INFORMATION

This patent application does not claim priority from any application.

TECHNICAL FIELD

The present subject matter described herein, in general, relates to node profiling and more particularly to profiling one or more nodes based on a hybrid Key Performance Indicator (KPI) associated to a node in a communication network. The hybrid KPI is based on combination of a set of event based Performance Management (PM) counters and a set of protocol based PM counters.

BACKGROUND

Due to an exponential increase in mobile telephony, wireless ecosystem is in a constant state of flux. It has been observed that traffic in wireless ecosystem has surpassed conventionally fixed threshold levels. Thus, in order to cope with the traffic, one or more of software patches, hardware swap-outs, new chipsets and others are continuously implemented in the wireless ecosystem. As a result, the wireless ecosystem is under constant surveillance and any degradation in network performance requires real time attention to locate and recover the health of the wireless ecosystem. Further, conventional system and methodologies exclusively depends on Subject Matter Expert (SME) to identify and resolve one or more issues. It is to be noted that the SME identifies the one or more issues based on Key Performance Indicator (KPI) associated to the one or more issues. The KPI may be dependent on a plurality of parameters. However, it becomes impossible for the SME to accurately identify an impact of an issue associated to one or more KPI at the same time. Further, the conventional system and methodologies fail to locate and recover the health of the wireless ecosystem in real time.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for profiling one or more nodes based on a hybrid Key Performance Indicator (KPI) associated with a node in a communication network and the concepts are further described below in the detailed description. This summary is not intended to identify essential features of the claimed subject matter nor is it intended for use in determining or limiting the scope of the claimed subject matter.

In one implementation, a system for profiling one or more nodes based on a hybrid Key Performance Indicator (KPI) associated with a node in a communication network is disclosed. The system may comprise a processor and a memory coupled to the processor. The processor may execute programmed instructions stored in a plurality of modules present in the memory. The plurality of modules may comprise a receiving module, an identification module, a creation module, and a profile module. Initially, the receiving module may receive a flag indicating an issue with a KPI associated with a node present in a network of nodes. The identification module may identify a set of Performance Management (PM) counters undergoing periodic changes in performance beyond a predefined threshold value by using machine learning based statistical techniques. In one aspect, the set of PM counters may comprise a set of event based PM counters and a set of protocol based PM counters. The creation module may create a hybrid KPI based on combination of the set of event based PM counters and the set of protocol based PM counters by using the machine learning based statistical techniques. The hybrid KPI may indicate performance of the node. Furthermore, the profile module may profile one or more nodes, present in the network of nodes, by comparing the hybrid KPI associated with the node with hybrid KPI corresponding to each of the one or more nodes.

In another implementation, a method for profiling one or more nodes based on a hybrid Key Performance Indicator (KPI) associated with a node in a communication network is disclosed. In order to profile the one or more nodes, initially, a flag may be received indicating an issue with a KPI associated with a node present in a network of nodes. Upon receiving the flag, a set of Performance Management (PM) counters undergoing periodic changes in performance beyond a predefined threshold value may be identified by using machine learning based statistical techniques. In one aspect, the set of PM counters may comprise a set of event based PM counters and a set of protocol based PM counters. Further, a hybrid KPI may be created based on combination of the set of event based PM counters and the set of protocol based PM counters by using the machine learning based statistical techniques. The hybrid KPI may indicate performance of the node. Subsequently, one or more nodes, present in the network of nodes, may be profiled by comparing the hybrid KPI associated with the node with hybrid KPI corresponding to each of the one or more nodes. In another aspect, the aforementioned method for profiling one or more nodes based on a hybrid KPI associated with a node in a communication network may be performed by a processor using programmed instructions stored in a memory.

In yet another implementation, non-transitory computer readable medium embodying a program executable in a computing device for profiling one or more nodes based on a hybrid Key Performance Indicator (KPI) associated with a node in a communication network is disclosed. The program may comprise a program code for receiving a flag indicating an issue with a KPI associated with a node present in a network of nodes. The program may further comprise a program code for identifying a set of Performance Management (PM) counters undergoing periodic changes in performance beyond a predefined threshold value by using machine learning based statistical techniques. The set of PM counters comprise a set of event based PM counters and a set of protocol based PM counters. The program may further comprise a program code for creating a hybrid KPI based on combination of the set of event based PM counters and the set of protocol based PM counters by using the machine learning based statistical techniques, wherein the hybrid KPI indicates performance of the node. The program may further comprise a program code for profiling one or more nodes, present in the network of nodes, by comparing the hybrid KPI associated with the node with hybrid KPI corresponding to each of the one or more nodes.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
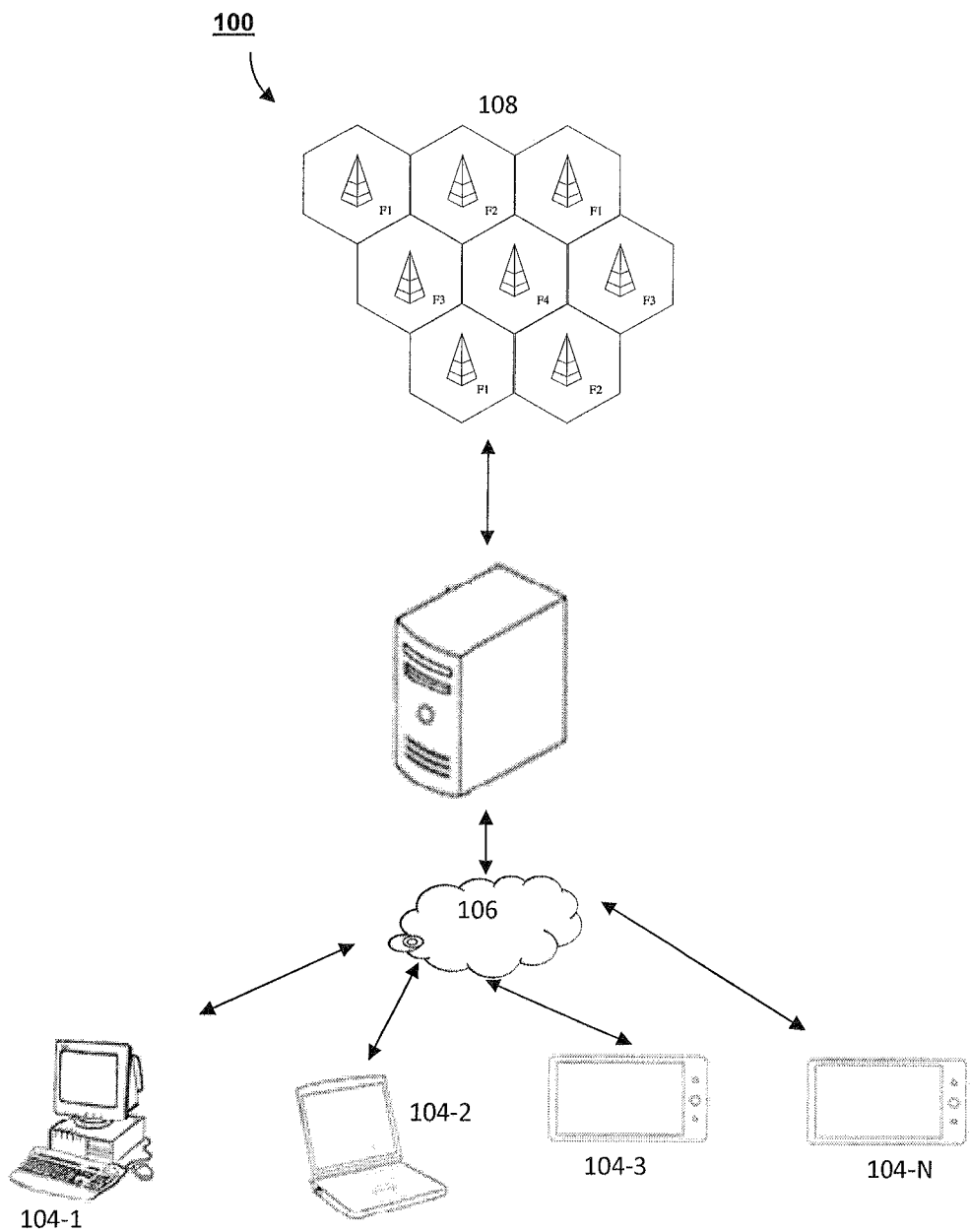
FIG. 1 illustrates a network implementation of a system for profiling one or more nodes based on a hybrid Key Performance Indicator (KPI) associated to a node in a communication network, in accordance with an embodiment of the present subject matter.

Some embodiments of this disclosure, illustrating all its features, will now be discussed in detail. The words "including," "comprising," "consisting," and "having," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention facilitates profiling one or more nodes based on a hybrid Key Performance Indicator (KPI) associated to a node in a communication network. It is to be noted that the KPI indicates behavior of each node present in a network of nodes of the communication network. Example of the KPI may include, but not limited to, call drop rate, network failure, equipment failure, response time, waiting time, probability of immediate execution, CPU utilization, and throughput. The KPI may be computed by applying machine learning based statistical techniques on a set of Performance Management (PM) counters influencing the KPI. The set of PM counters may include, but not limited to, a count of call attempts, count of incoming calls, count of outgoing calls, events, success rate, reset events, resource usage, traffic data, signaling, and a call drop rate. Example of the machine learning based statistical techniques may include, but not limited to, a regression model, random forests model, and a clustering model. The PM counters may further comprise a set of event based PM counters and a set of protocol based PM counters. Example of the set of event based PM counters may include, but not limited to, call attempts, count of incoming calls, and count of outgoing calls. Example of the protocol based PM counter may include, but not limited to, count of number of Radio Bearer (RB) reconfigurations, number of Radio Link (RL) additions, traffic data, specific signaling interactions/messaging per cell or per user.

In order to profile the one or more nodes, present in a network of nodes, it is important to analyze KPI of each node. It is to be noted that KPI inherits characteristics of the set of event based PM counters and the set of protocol based PM counters. As the set of PM counters is a time dependent KPI, properties of the set of PM counters may change periodically. Thus, it is imperative to determine performance of each PM counter from the set of PM counters in real-time. However, conventional techniques fail to analyze the set of PM counters in real-time. Thus, the conventional techniques result in additional time of a Subject Matter Expert (SME) to detect an issue with the KPI. In addition, as the conventional techniques are dependent upon expertise of the SME, there has always been probability of missing at least one PM counter leading to inappropriate profiling of the one or more nodes. On the other hand, the present subject matter discloses creation of a hybrid KPI to profile the one or more nodes automatically based on the hybrid KPI.

In order to create the hybrid KPI, a flag indicating an issue with a KPI associated to a node may be received. Upon receipt of the flag, a set of PM counters undergoing periodic change in performance may be identified. The set of PM counters may be identified by comparing magnitude of each PM counter, from the set of PM counters, with a predefined threshold value. It is to be noted that the magnitude indicates real-time performance of the PM counters. Thresholding may be a tunable provided to the SME to filter out known or expected variations in data. For example, due to a specific feature or re-dimensioning, certain parameters are expected to change significantly. Depending on the requirement or actual use case, the thresholding step may be exercised or skipped. Furthermore, the hybrid KPI may be created based upon combination of the set of event based PM counters and the set of protocol based PM counters.

Upon creating the hybrid KPI, the one or more nodes present in the network of nodes may be profiled by comparing the hybrid KPI associated to the node with hybrid KPI corresponding to each of the one or more nodes. Once the one or more nodes are profiled, a patch may be installed to resolve the flag. It is to be noted that outcome of the profiling may reveal other network nodes that may benefit from the patch although the flag indicating the degradation may or may not have yet risen on the set of network nodes. In an implementation, the patch may be a resolution of a software issue or replacement of hardware equipment.

While aspects of described system and method for profiling one or more nodes based on the hybrid KPI associated to the node and may be implemented in any number of different computing systems, environments, and/or configurations, the embodiments are described in the context of the following exemplary system.

Referring now to FIG. 1, a network implementation 100 of a system 102 for profiling one or more nodes based on a hybrid Key Performance Indicator (KPI) associated to a node in a communication network is disclosed. Initially, the system 102 may receive a flag indicating an issue with a Key Performance Indicator (KPI) associated to a node present in a network of nodes. The system 102 may identify a set of Performance Management (PM) counters undergoing periodic changes in performance beyond a predefined threshold value by using machine learning based statistical techniques. In one aspect, the set of PM counter s may comprise a set of event based PM counters and a set of protocol based PM counters.

Further, the system 102 may create a hybrid KPI based on combination of the set of event based PM counters and the set of protocol based PM counters by using the machine learning based statistical techniques. The hybrid KPI may indicate performance of the node. Furthermore, the system 102 may profile one or more nodes, present in the network of nodes, by comparing the hybrid KPI associated to the node with hybrid KPI corresponding to each of the one or more nodes.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the system 102 may be connected to the network of nodes 108 through the network 106. Each node present in the network of nodes 108 may be connected to every other node through the network 106. It is to be noted that each node represents a base station or a network station of a telecommunication network. In another implementation, the telecommunication network may be wireless or wired implemented as one of the different types of networks, such as intranet, local area network (LAN), wide area network (WAN), the internet, and the like.

In another implementation, the network 106 may be a wireless network, a wired network or a combination thereof. The network 106 can be implemented as one of the different types of networks, such as intranet, local area network (LAN), wide area network (WAN), the internet, and the like.

The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
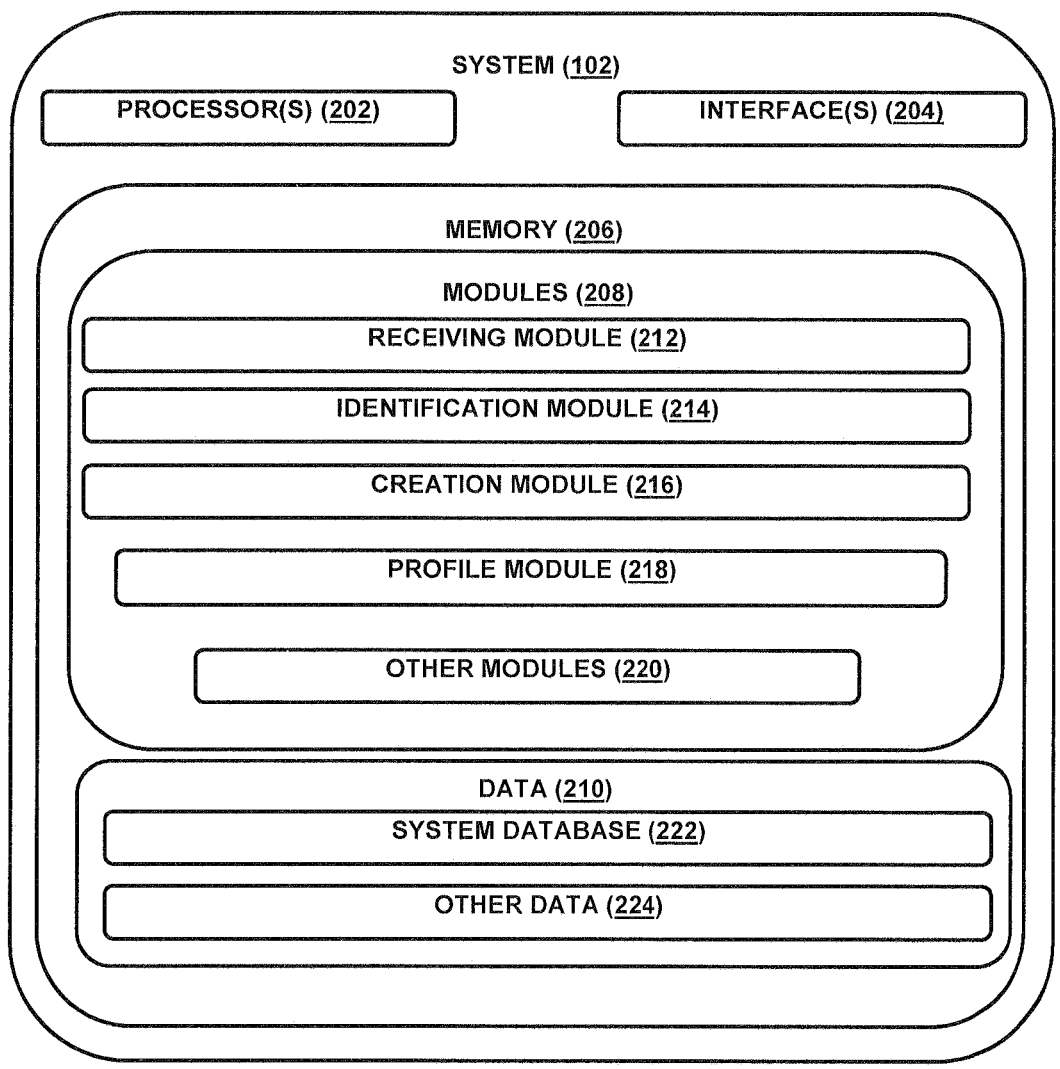
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. At least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, an identification module 214, a creation module 216, and a profile module 218 and other modules 220. The other modules 220 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 222 and other data 224. The other data 224 may include data generated as a result of the execution of one or more modules in the other modules 220.

As there are various challenges observed in the existing art, the challenges necessitate the need to build the system 102 for profiling one or more nodes based on a hybrid Key Performance Indicator (KPI) associated to a node in a communication network, at first, a user may use the client device 104 to access the system 102 via the I/O interface 204. The user may register them using the I/O interface 204 in order to use the system 102. In one aspect, the user may access the I/O interface 204 of the system 102. The system 102 may employ the receiving module 212, the identification module 214, the creation module 216, and the profile module 218. The detail functioning of the modules is described below with the help of figures.

The present system 102 facilitates profiling one or more nodes based on a hybrid Key Performance Indicator (KPI) associated to a node in a communication network. To do so, initially, the receiving module 212 receives a flag from at least one of a consumer, a network operator, a third party service provider, a technician, and a subject matter expert. The flag may indicate an issue in a particular area covered by the node. Example of the issue may include, but not limited to, call drop rate, network connectivity, cross connections, and portability problems. It is to be noted that each node in the communication network may be profiled based on the KPI associated to the node. The KPI indicates behavior of the devices operating in the node. Examples of the devices include mobile handsets, landline, laptop, computer, gaming consoles, and other. In one implementation, the flag may indicate an issue with a KPI associated to a node present in a network of nodes.

Once the flag is received, the identification module 214 identifies a set of Performance Management (PM) counters undergoing periodic changes in performance beyond a predefined threshold by using machine learning based statistical techniques. It is to be noted that the set of PM counters influence the KPI. The set of PM counters may comprise at least one of a set of event based PM counters and a set of protocol based PM counters. Example of the set of event based PM counters may include, but not limited to, call attempts, count of incoming calls, and count of outgoing calls. Example of the set of protocol based PM counters may include, but not limited to, a count of number of Radio Bearer (RB) reconfigurations, number of Radio Link (RL) additions, traffic data, signaling, and a call drop rate. It must be noted that any change in a set of Configuration Management (CM) parameters influencing the KPI may also affect performance of the set of PM counters. Thus, by analyzing both the set of event based and protocol based PM counters appropriate profiling of the nodes may be achieved.

Below table provides detailed overview of the event based and protocol based PM counters for profiling of the nodes in accordance with an embodiment of the present subject matter.

| Protocol Level counter | Event based counter | Formula | Interpretation |
| --- | --- | --- | --- |
| Nb of RadioLinkAdditions (NbRLAdd) | Nb of Active UEs (NbUE) | NbRLAdd/NbUE | Mobility/handover characteristics. At a lower level this may be used for Soft/Softer/Hard/Inter RAT Handover characterization. |
| Nb of RadioBearerReconfig (NbRbReconf) | Nb of Active UEs (NbUE) | NbRbReconf/NbUE | Reconfiguration characteristics per call. Indicates how effective the initial bearer configuration is. If it is reconfigured too many times, it means the standard/default configuration needs improvement. |
| Nb of RadioBearerReconfig (NbRbReconf) | Nb of home UEs (NbHUE) | NbRbReconf/NbHUE | Deep dive reconfiguration characteristics. Based on the denominator value, the reconfiguration characteristics may characterize the reconfigurations per home UE, per incoming UE, per outgoing UE, per type of UE (UE category), per type of call etc. This gives SMEs an idea of which specific aspect of reconfiguration is underperforming and therefore requires improvement |
| Nb of Tx/Rx packets in a specific interface - say a specific VLAN in S1-U interface (NbVLANTx) | Nb of Active UEs (NbUE) | NbVLANTx/NbUE | VLAN usage characteristics. Indicates how effectively a specific VLAN ID is used - per active UE. This way transport resources or their priorities can be re-calibrated for more optimized behavior |
| Max Tx power of a cell (MxTxP) | Nb of Active UEs (NbUE) | MxTxP/NbUE | Gives a power per user view of a specific cell. This can be drilled down to more specifics such as power for signaling and user-plane data etc. This is also expected to be different for in-building cells vs highway cells/rural/urban cells |

It is to be noted that the 'Nb', 'UE', 'Tx' and 'Rx' are the abbreviations for number, user, transmit and receive, respectively. Further, it may be noted that the 'Tx' and 'Rx' metrics are referenced to the node being monitored. Transmit indicates transmission from the node, and receive indicates reception to the node.

Figure 8:
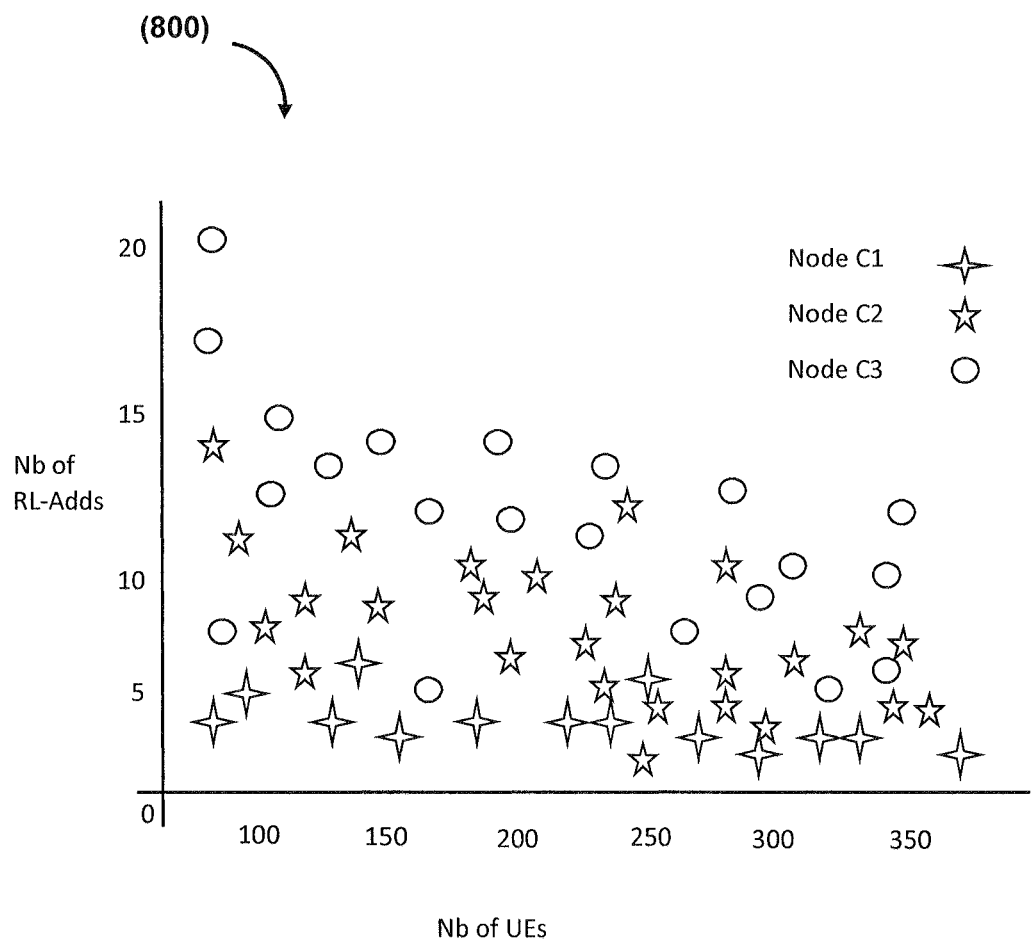
FIG. 8 illustrates a number of active users in nodes against a number of radio link additions recorded over a period of time, in accordance with an embodiment of the present subject matter.
Figure 9:
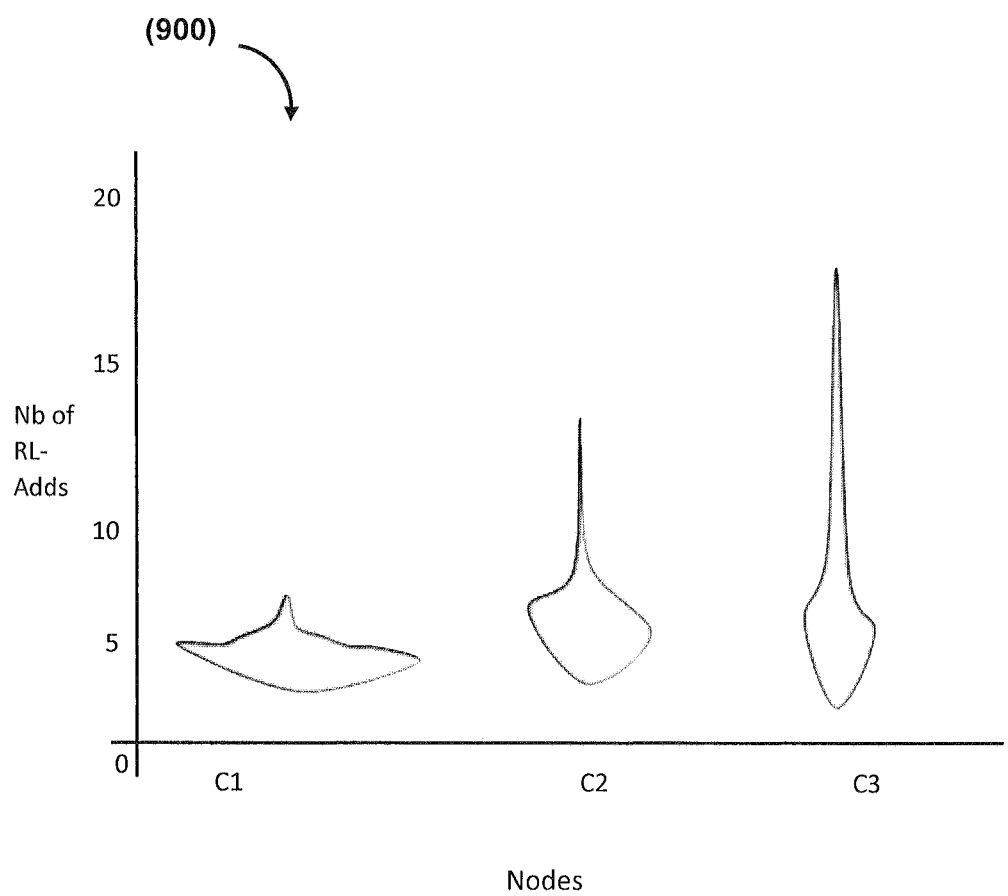
FIG. 9 illustrates a violin plot graph of the nodes mapped against the number of radio link additions recorded over a period of time, in accordance with an embodiment of the present subject matter.

In an exemplary embodiment FIG. 8 illustrates a number of active users in nodes C1, C2, and C3 against the number of Radio Link Additions recorded over a period of time. In order to better understand impact of profiling, the SME may also be provided with a violin plot, as shown in FIG. 9, of nodes of C1, C2, and C3 against the number of Radio Link Additions recorded over a period of time. The violin plot facilitates to understand each node individually before profiling the node.

In one embodiment, the set of PM counters may be identified by computing mean of variation in magnitude of each PM counter. In another embodiment, the set of PM counters may be identified by computing variance of the variation in magnitude of each PM counter. It is to be noted that the magnitude indicates real-time performance of the set of PM counters. The set of PM counters represents behavioral aspect of the node. The magnitude of each PM counter may change depending on time of day, day of week, month of the year and a like. In one aspect, the predefined threshold value may be calculated based on variation in the magnitude of each PM counter at a particular time of the day. The predefined threshold value may be calculated based on historical data of variation in magnitude of each PM counter. Examples of the PM counter may include, but not limited to, a count of call attempts, count of incoming calls, count of outgoing calls, events, success rate, reset events, resource usage, traffic data, signaling, and a call drop rate.

In one implementation, top-n PM counters undergoing periodic change within a time frame may be identified. Typically, the time frame may be 15-minutes, 30-minutes, 1 hour and so on. Example of the machine learning based statistical techniques may comprise at least one of a regression model, random forests model, and a clustering model. It is to be noted that in order to apply the machine learning based statistical techniques the set of PM counters may be cleaned using data preprocessing techniques. In yet another implementation, machine learning techniques for handling missing data, no data, loss of data, tracing data, and others may be implemented based on nature and range of the set of PM counters showing anomalies in performance.

The creation module 216 creates a hybrid KPI based on combination of the set of event based PM counters and the set of protocol based PM counters by using the machine learning based statistical techniques. It is to be noted that the hybrid KPI indicates performance of the node. The machine learning based statistical techniques may be utilized to perform an auto correlation, variance computing, clustering, instances of modification, and magnitude of impact.

In one example, if "number of RB reconfiguration" is determined as the event based PM counter, "calls from home-cell", "incoming calls from neighbor", and "outgoing calls to neighbor" may the protocol based PM counters associated to the "number of RB reconfiguration" counter. Upon performing the machine learning based statistical techniques, the creation module 216 may create the hybrid KPI comprising "reconfigurations per home", "reconfigurations per incoming call", "reconfigurations per outgoing call", "reconfigurations of type streaming per home", "reconfigurations of type streaming per incoming call", "reconfigurations of type streaming per outgoing call", "CS reconfigurations per home", "CS reconfigurations per incoming call", and "CS reconfigurations per outgoing call". It must be noted that the hybrid KPI provides root level analysis about performance of each node in real-time. Typically, the hybrid KPI may comprise a division of the event based PM counter with the protocol based PM counter, streaming type profiles, and voice profiles for each protocol associated to the PM counter identified from the set of PM counters.

Subsequent to creating the hybrid KPI, the profile module 218 may profile one or more nodes present in the network of nodes. In order to profile the one or more nodes, the profile module 218 may compare the hybrid KPI associated to the node with hybrid KPI corresponding to each of the one or more nodes. In one example, the one or more nodes having similar hybrid KPI as that of the node may be profiled by the profile module 218 as identical to the node. Example of profiles may include, but not limited to, a highway cell, a rural cell, a metro cell and an urban cell.

It is important to note that once the one or more nodes are profiled, a patch may be installed at the node to resolve the flag. It is to be noted that the patch may be installed remotely. The patch may be based on the based on the hybrid KPI. In an example, the patch may be a feature activation, rollout/swap-out, fix rollout software code, hardware equipment, and others.

In order to elucidate further, consider an example of the system 102 in accordance with the embodiment of the present subject matter. The system 102 comprises a network of nodes C1, C2, C3, . . . Cn. Considering 5-hybrid KPIs created are "CPU utilization", "S5 Bandwidth", "EPC-Average memory usage", "Cell-Tx power percent", and "S1 loss". Each hybrid KPI is calculated based on 100 call attempts per home. It is to be noted that each hybrid KPI is mapped on each axis of a radar map to view an impact of the hybrid KPI.

Figure 3:
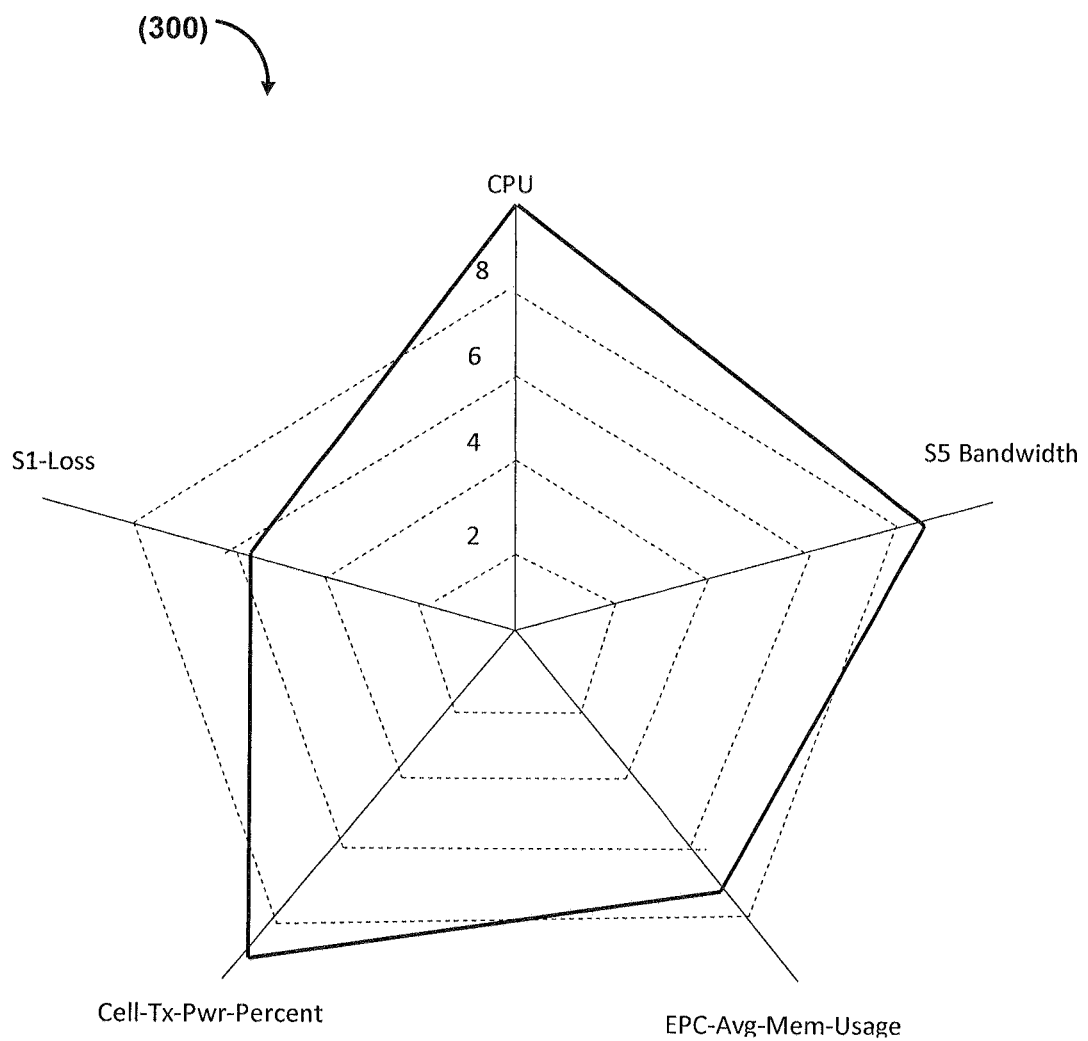
FIGS. 3, 4, 5 and 6 illustrate an example of the system, in accordance with an embodiment of the present subject matter.
Figure 4:
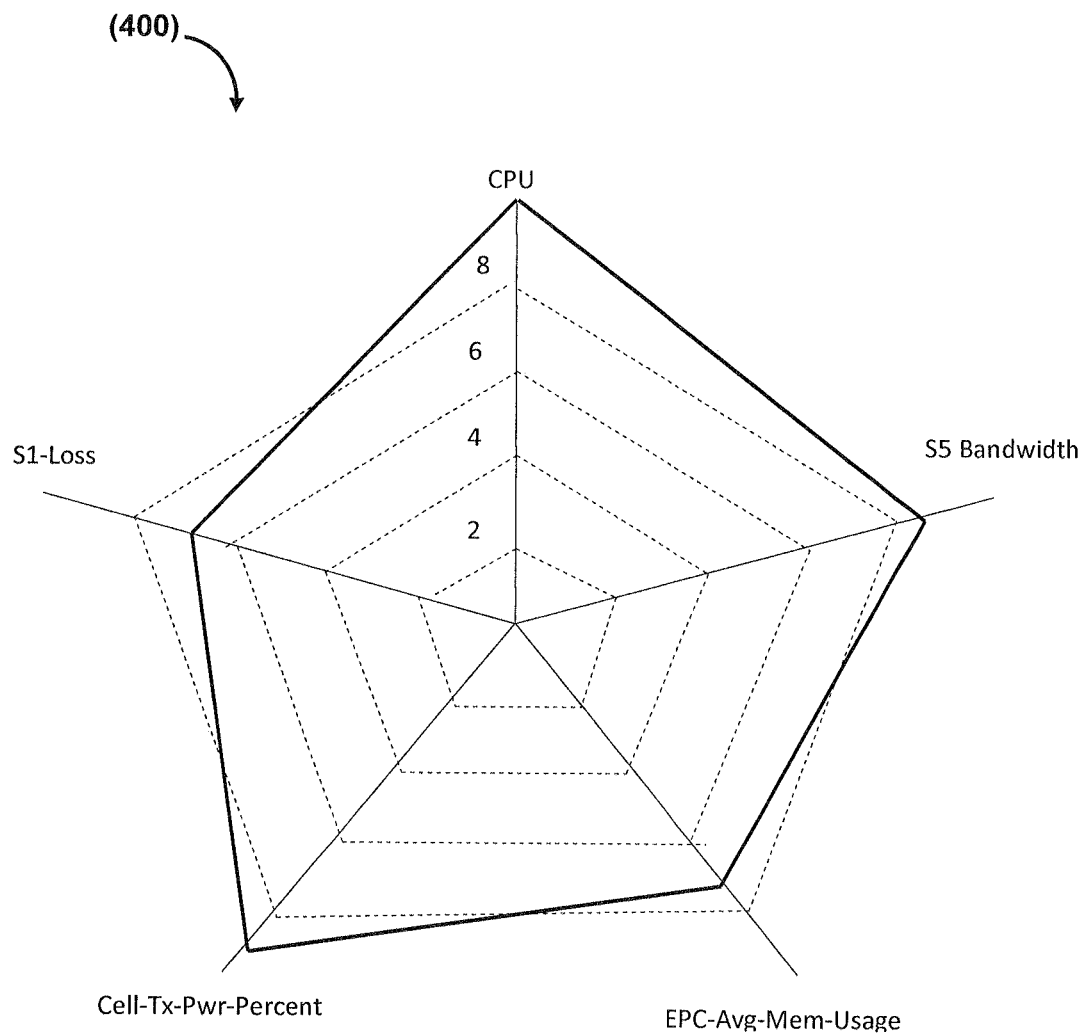
Figure 5:
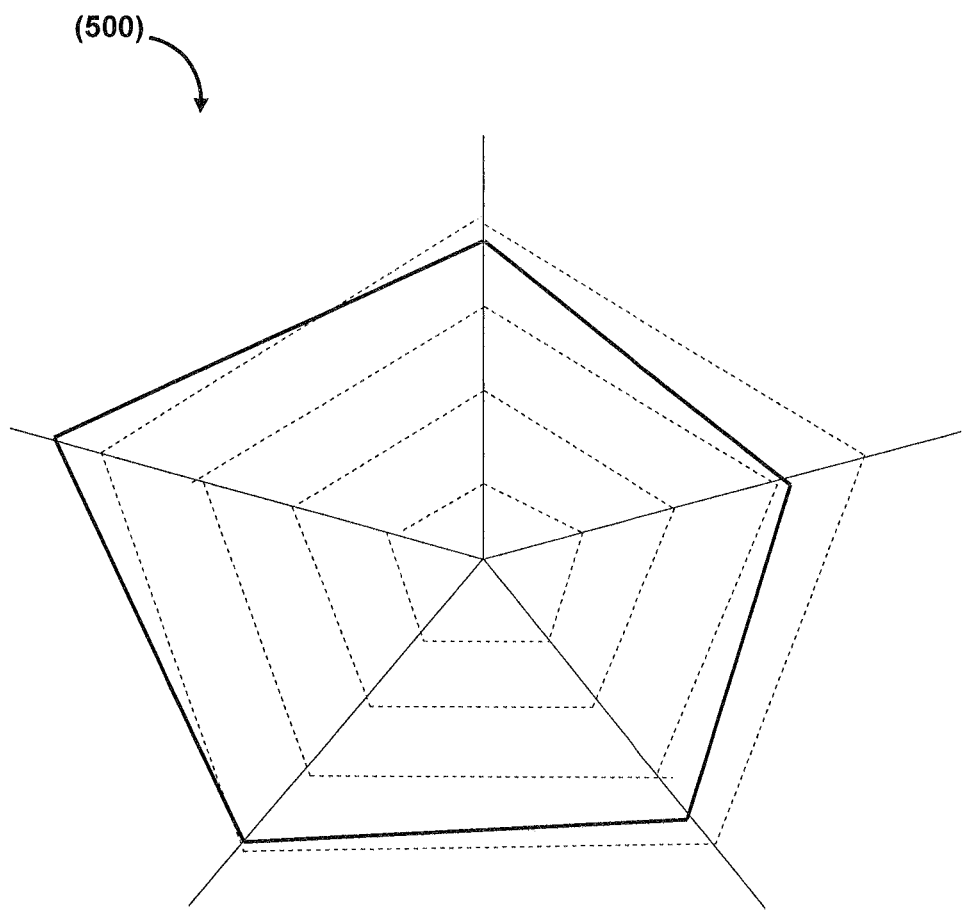

FIGS. 3, 4, and 5 represent radar maps for the nodes C1, C2, and C3 respectively. The FIG. 3 illustrates a radar map 300 having values of the 5 hybrid KPIs for the node C1. FIG. 4 illustrates a radar map 400 having values of the 5 hybrid KPIs for the node C2. FIG. 5 illustrates radar map 500 having values of the 5 hybrid KPIs for the node C3.

Figure 6:
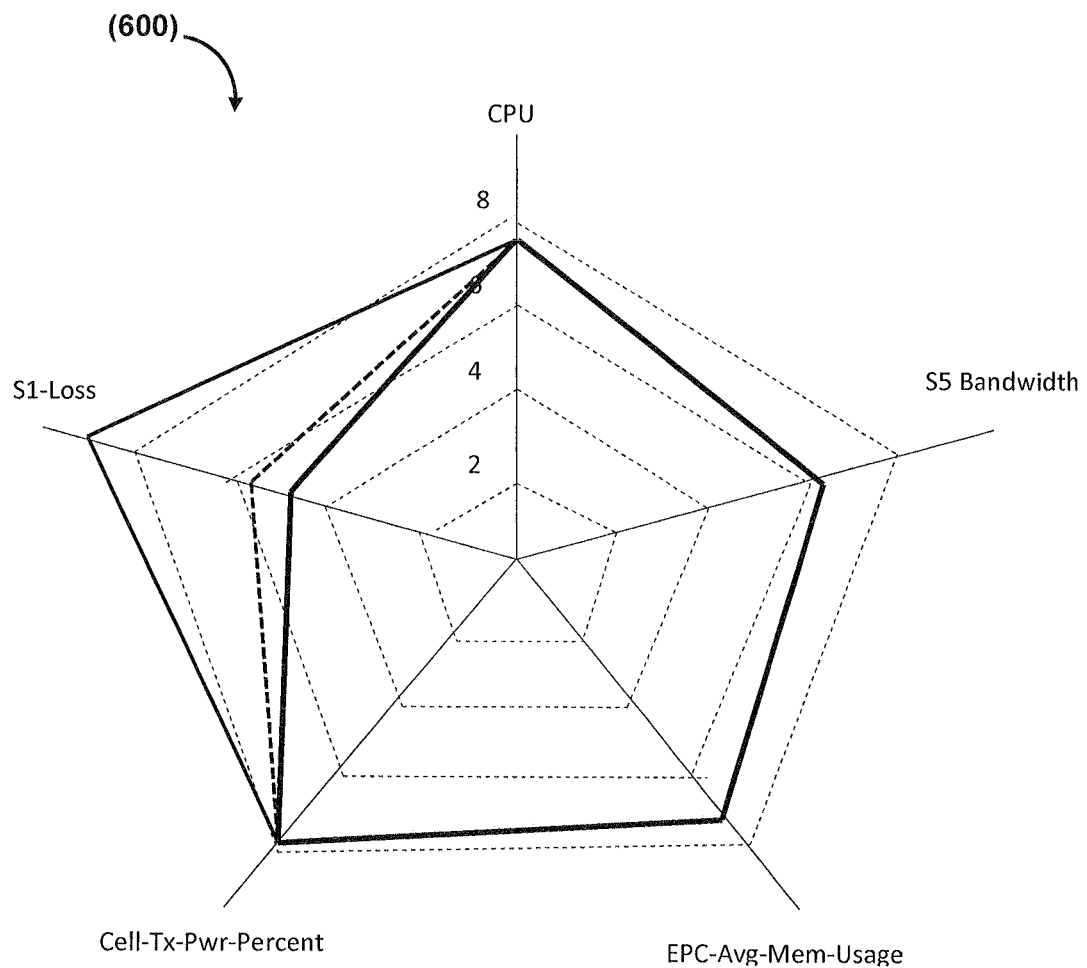

Now referring to FIG. 6, a radar map 600 illustrating a combined view of the 5 hybrid KPIs for the nodes C1, C2, and C3 is shown in accordance with the embodiment of the present subject matter. The radar map 600 shows a combined view to present a visual comparison of nodes C1, C2 and C3. Axes represent values of the 5 hybrid KPIs indicating similarity/dis-similarity between the nodes C1, C2, and C3. The radar map 600 facilitates a Subject Matter Expert (SME) to analyze and identify the hybrid KPI influencing performance of the nodes. The subject matter expert may install a patch for resolving the issue with the 5 hybrid KPIs at the nodes C1, C2, and C3. Upon installing, the SME may confirm that a fix that resolved a problem for C1 may also be applicable to C2 and C3. In an embodiment, the subject matter expert may install a patch to improve functioning of the nodes C1, C2, and C3.

Figure 7:
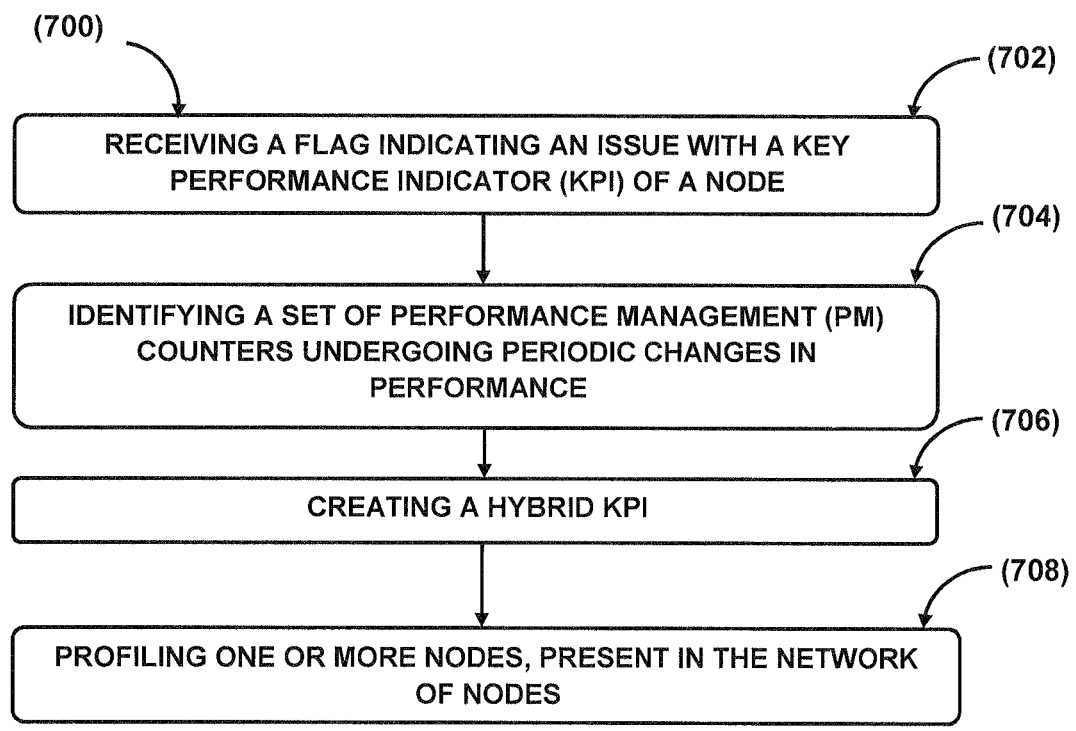
FIG. 7 illustrates a method for profiling one or more nodes based on a hybrid Key Performance Indicator (KPI) associated to a node in a communication network, in accordance with an embodiment of the present subject matter.

Referring now to FIG. 7, a method 700 for profiling one or more nodes based on a hybrid Key Performance Indicator (KPI) associated to a node in a communication network, in accordance with an embodiment of the present subject matter. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any number of the described method blocks can be combined in any order to implement the method 700 or alternate methods. Additionally, individual blocks may be deleted from the method 700 without departing from the spirit and scope of the subject matter described herein. Furthermore, the method can be implemented in any suitable hardware, software, firmware, or combination thereof. However, for ease of explanation, in the embodiments described below, the method 700 may be considered to be implemented as described in the system 102.

At block 702, a flag indicating an issue with a Key Performance Indicator (KPI) associated to a node present in a network of nodes may be received. In one implementation, the flag may be received by a receiving module 212.

At block 704, a set of Performance Management (PM) counters undergoing periodic changes in performance beyond a predefined threshold by using machine learning based statistical techniques may be identified. The set of PM counters may comprise a set of event based PM counters and a set of protocol based PM counters. In one implementation, the set of PM counters may be identified by an identification module 214.

At block 706, a hybrid KPI may be created based on combination of the set of event based PM counters and the set of protocol based PM counters by using the machine learning based statistical techniques. In one implementation, the hybrid KPI may be created by a creation module 216.

At block 708, one or more nodes, present in the network of nodes, may be profiled by comparing the hybrid KPI associated to the node with hybrid KPI corresponding to each of the one or more nodes. In one implementation, the one or more nodes may be profiled based on a profile module 218.

Exemplary embodiments discussed above may provide certain advantages. Though not required to practice aspects of the disclosure, these advantages may include those provided by the following features.

Some embodiments enable profiling of one or more nodes in real time based on the hybrid KPI.

Some embodiments enable a system and a method to analyze each node present in the network of nodes using analytical tools.

Some embodiments enable a system and a method to instantaneously locate and fix issues related to one or more nodes.

Some embodiments enable a system and a method to automate patch installation at one or more nodes.

Some embodiments enable a system and a method to replicate network procedures at the one or more nodes simultaneously.

Some embodiments enable a system and a method to reduce costs incurred to identify and resolve the issue at the node.

Some embodiments enable a system and a method to expedite network level operations and facilitate Subject Matter Experts (SME) with profiling mechanism to audit nodes and choose fix applicability.

Although implementations for methods and systems for profiling one or more nodes based on a hybrid Key Performance Indicator (KPI) associated to a node in a communication network have been described in language specific to structural features and/or methods, it is to be understood that the appended claims are not necessarily limited to the specific features or methods described. Rather, the specific features and methods are disclosed as examples of implementations for profiling one or more nodes based on a hybrid Key Performance Indicator (KPI) associated to a node in a communication network.

The invention claimed is:

1. A system for profiling one or more nodes based on a hybrid Key Performance Indicator (KPI) associated with anode in a communication network, the system comprising:
   a memory;
   a processor coupled to the memory, wherein the processor is configured to execute programmed instructions stored in the memory for:
      receiving a flag indicating an issue with a Key Performance Indicator (KPI) associated with a node present in a network of nodes;
      identifying a set of Performance Management (PM) counters undergoing periodic changes in performance beyond a predefined threshold value by using machine learning based statistical techniques, wherein the set of PM counters comprises a set of event based PM counters and a set of protocol based PM counters, and wherein the thresholding is tunable;
      creating a hybrid KPI based on combination of the set of event based PM counters and the set of protocol based PM counters by using the machine learning based statistical techniques, wherein the hybrid KPI indicates performance of the node; and
      profiling one or more nodes, present in the network of nodes, by comparing the hybrid KPI associated with the node with hybrid KPI corresponding to each of the one or more nodes.

2. The system of claim 1 further comprises installing a patch at the node to resolve the flag, wherein the patch is installed based on the hybrid KPI.

3. The system of claim 1, wherein the set of event based PM counters comprise at least one of: a call attempts count of incoming calls and a count of outgoing calls.

4. The system of claim 1, wherein the set of protocol based PM counters comprises at least one of a count of number of Radio Bearer (RB) reconfigurations, a number of Radio Link (RL) additions, traffic data, signaling, and a call drop rate.

5. The system of claim 1, wherein the machine learning based statistical techniques comprise at least one of: a regression model, random forests model, and a clustering model.

6. A method for profiling one or more nodes based on a hybrid Key Performance Indicator (KPI) associated with a node in a communication network, the method comprising:
   receiving, by a processor, a flag indicating an issue with a Key Performance Indicator (KPI) associated to a node present in a network of nodes;
   identifying, by the processor, a set of Performance Management (PM) counters undergoing periodic changes in performance beyond a predefined threshold value by using machine learning based statistical techniques, wherein the set of PM counters comprises a set of event based PM counters and a set of protocol based PM counters, and wherein the thresholding is tunable;
   creating, by the processor, a hybrid KPI based on combination of the set of event based PM counters and the set of protocol based PM counters by using the machine learning based statistical techniques, wherein the hybrid KPI indicates performance of the node; and profiling, by the processor, one or more nodes, present in the network of nodes, by comparing the hybrid KPI associated with the node with hybrid KPI corresponding to each of the one or more nodes.

7. The method of claim 6 further comprises installing a patch at the node to resolve the flag, wherein the patch is installed based on the hybrid KPI.

8. The method of claim 6, wherein the set of event based PM counters comprise at least one of call attempts, a count of incoming calls, and a count of outgoing calls.

9. The method of claim 6, wherein the set of protocol based PM counters comprise at least one of: a count of number of Radio Bearer (RB) reconfigurations, number of Radio Link (RL) additions, traffic data, signaling, and a call drop rate.

10. The method of claim 6, wherein the machine learning based statistical techniques comprises at least one of a regression model, random forests model, and a clustering model.

11. A computer program product having embodied thereon a computer program for profiling one or more nodes based on a hybrid Key Performance Indicator (KPI) associated to a node in a communication network, the computer program product comprising:

a program code for receiving a flag indicating an issue with a Key Performance Indicator (KPI) associated with a node present in a network of nodes;

a program code for identifying a set of Performance Management (PM) counters undergoing periodic changes in performance beyond a predefined threshold value by using machine learning based statistical techniques, wherein the set of PM counters comprises a set of event based PM counters and a set of protocol based PM counters, and wherein the thresholding is tunable;

a program code for creating a hybrid KPI based on combination of the set of event based PM counters and the set of protocol based PM counters by using the machine learning based statistical techniques, wherein the hybrid KPI indicates performance of the node; and a program code for profiling one or more nodes, present in the network of nodes, by comparing the hybrid KPI associated with the node with hybrid KPI corresponding to each of the one or more nodes.

* * * * *